US008880460B2

(12) United States Patent
Rieffanaugh, Jr.

(10) Patent No.: US 8,880,460 B2
(45) Date of Patent: **\*Nov. 4, 2014**

(54) DVIVD MATCH AUDIT SYSTEM AND 5 STAR EVENT DATA RECORDER METHOD THEREOF

(76) Inventor: Neal King Rieffanaugh, Jr., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/342,935

(22) Filed: Jan. 3, 2012

(65) Prior Publication Data

US 2012/0173480 A1 Jul. 5, 2012

Related U.S. Application Data

(60) Provisional application No. 61/460,360, filed on Dec. 31, 2010.

(51) Int. Cl.
*G06F 7/00* (2006.01)
*G06Q 10/00* (2012.01)

(52) U.S. Cl.
CPC ..................................... *G06Q 10/00* (2013.01)
USPC .................................. 707/607; 707/E17.032

(58) Field of Classification Search
CPC . G06F 19/328; G06F 21/6245; G06F 19/322; G06F 19/3418; G06F 19/323; G06F 19/3456; G06F 21/445; G06F 21/6227; G06F 21/64; G06F 9/06

USPC ................................................ 707/607; 705/4
See application file for complete search history.

(56) References Cited

U.S. PATENT DOCUMENTS

| 6,826,541 | B1 * | 11/2004 | Johnston et al. ............. 705/36 R |
| 7,519,519 | B1 * | 4/2009 | Eynon et al. ..................... 703/2 |
| 2006/0106717 | A1 * | 5/2006 | Randle et al. ................... 705/45 |
| 2011/0145039 | A1 * | 6/2011 | McCarney et al. .......... 705/7.32 |

* cited by examiner

*Primary Examiner* — Shyue Jiunn Hwa

(57) ABSTRACT

A live dual audit system and recorder method validating and independently verifying element effort event data, assigning audit levels to element effort reports displaying audit level icons whether effort event data is submitted by effort owner or generated by the system's dynamic method, and whether the effort is acknowledged by the project owner. A semi-automated first audit examines repository auditor input effortology decisions against provided effort exhibit data. A fully automated second audit examines dynamically generated system effort data against repository data. A DVIVD event data match audit recorder displays real time dynamic dual audit test reports with each effort audit level movement, and indicates any element effort audit mismatch data system location. An element's audited effort dataset level is displayed in the DVIVD event data match audit recorder until all dataset requirements are fulfilled and satisfy that element's highest audit level, and displays a "System Audit Certified" icon report.

4 Claims, 17 Drawing Sheets

High-Line Logic Data Flow Diagram

DVIVD Event Data Match Audit Recorder Working Panel Components Diagram

FIG. 6 - DVIVD Event Data Match Audit [5 Star] Recorder w/ Primary Level #1 CPEI   114

DVIVD Event Data Match Audit Recorder

HEADER SECTION

☒ Registered    ☐ Non Registered

CPEI Owner Name: [Owner Name]  ~352
CPEI Owner ID: [CPEI Owner ID]  ~191
Primary CPEI ID: [CPEI ID#]
Primary CPEI Media Category: [Media Category]

5 STAR EVENT DATA RECORDER SECTION  ~192

01/10/2008     One Element: Validated and Verified     ☆

[Date]         Two Elements Validated and Verified     ☆ ☆

[Date]         Three Elements Validated and Verified   ☆ ☆ ☆

[Date]         Four Elements Validated and Verified    ☆ ☆ ☆ ☆

[Date]         Five Elements DVIVD System Certified    ☆ ☆ ☆ ☆ ☆

DVIVD MATCH AUDIT TESTING & FORMULAIC DATA FIELD ANALYSIS

CPEI AUDIT #1 AND AUDIT #2 DATA MATCH TESTING SECTION  ~194

ELEMENT OWNER AND CPEI DATA FIELD AUDIT REPORT SECTION  ~196

190

Element Owner and CPEI Data Field Audit Report Section

DVIVD Event Data Match Audit Testing Component Flow Chart

Secondary and Tertiary CPEI Display

Secondary Efforts

"Holden Cutterfly" (Performing Artist: <u>Nariah Darey</u>), <u>Album</u> (3 Min. 45 Sec.): R & B – 10/15/2005: <u>Vniversal Records</u> ~226
- <u>Nichael Tchlesinger</u>: Mixed ★ ★ ★ ★
  - <u>Harry Blevins</u>, Manager (2/1/05-2/15/05) ✓ ~240

Tertiary Efforts

"Holden Cutterfly" (Performing Artist: <u>Nariah Darey</u>), <u>Album</u> (3 Min. 45 Sec.): R & B – 10/15/2005: <u>Vniversal Records</u> ~228
- <u>Nichael Tchlesinger</u>: Mixed ★ ★ ★ ★
  - <u>Harry Blevins</u>: Manager > <u>John Tandy</u>, Attorney (2/1/05-2/15/05) ✓ ~240

FIG. 11b

Secondary Efforts

"Holden Cutterfly" (Performing Artist: <u>Nariah Darey</u>), <u>Album</u> (3 Min. 45 Sec.): R & B – 10/15/2005: <u>Vniversal Records</u> ~226
- <u>Nichael Tchlesinger</u>: Mixed ★ ★ ★ ★
  - <u>Harry Blevins</u>, Manager (2/1/05-2/15/05) ★ ~241

Tertiary Efforts

"Holden Cutterfly" (Performing Artist: <u>Nariah Darey</u>), <u>Album</u> (3 Min. 45 Sec.): R & B – 10/15/2005: <u>Vniversal Records</u> ~228
- <u>Nichael Tchlesinger</u>: Mixed ★ ★ ★ ★
  - <u>Harry Blevins</u>: Manager > <u>John Tandy</u>, Attorney (2/1/05-2/15/05) ★ ~243

FIG. 11d 374

Auto CPEI and Auto Inference Association Displays

DVIVD MATCH AUDIT SYSTEM AND 5 STAR EVENT DATA RECORDER METHOD THEREOF

CROSS REFERENCE OF RELATED APPLICATION

This Non-Provisional application claims the benefit of priority under 35 U.S.C. sctn. 119 to a Provisional Application No. U.S. 61/460,360 filed Dec. 31, 2010, the contents of which are incorporated herein in their entirety.

BACKGROUND OF THE PRESENT INVENTION

1. Field of Invention

The present invention is directed to a dynamic dual audit method for auditing element effort event data utilizing a DVIVD Event Data Match Audit Recorder, assigning audit levels to said element effort event data, and generating audited reports of said element efforts.

2. Description of Related Arts

No related art was found for Match Audit Systems or Dual Match Audit Systems.

DETAILED DESCRIPTION OF THE PREFERRED EMBODIMENT

Referring to the drawings of the invention, a DVIVD Audit System and 5 Star Event Data Recorder Method Thereof are illustrated. It is understood that the components could be designed, arranged and developed in a myriad of configurations not displayed. It is also understood that the following detailed description of the present invention as referenced in the drawings are not intended to limit the scope of the present invention as claimed, but is only for illustration of the preferred embodiment of the present invention.

The present preferred embodiment of the invention will best be understood by reference to the drawings, wherein like parts are designated by like numerals throughout.

DESCRIPTION OF DRAWINGS

FIG. 6 is a visual representation of the DVIVD Event Data Match Audit Recorder according to the preferred embodiment.

FIG. 11 is an example of a report displaying a Secondary Effort and a Tertiary Effort.

LIST OF REFERENCE NUMERALS

Figure 1:
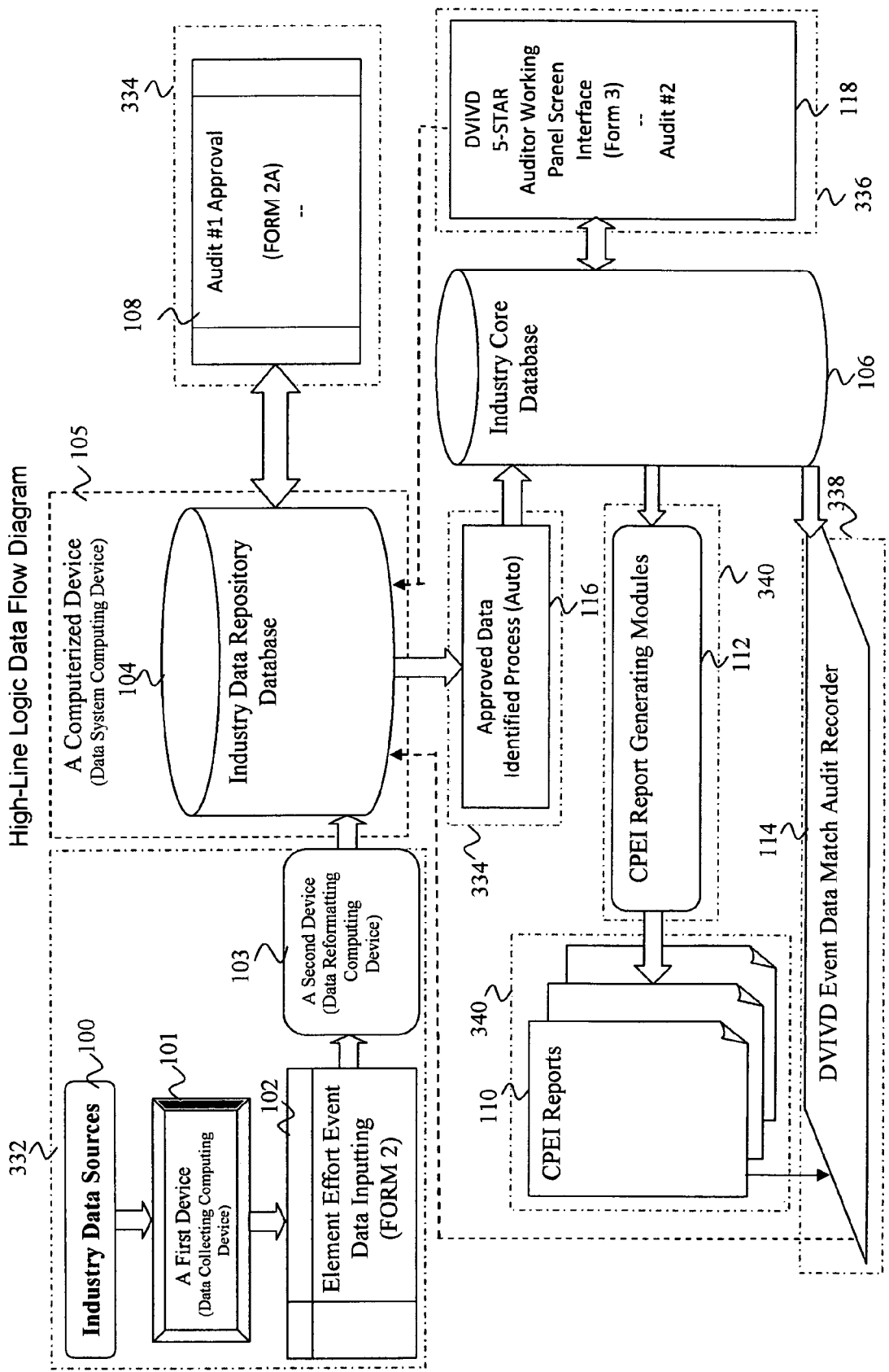
FIG. 1 illustrates the systems and processes utilized by the DVIVD Match Audit System and 5 Star Event Data Recorder Method Thereof.

100. Industry Data Sources
101. A First Device (Data Collecting Computing Device)
102. Element Effort Event Data Inputting (Form 2)
103. A Second Device (Data Reformatting Computing Device)
104. Industry Data Repository Database
105. A Computerized Device (Data System Computing Device)
106. Industry Core Database
108. Audit #1 Approval (Form 2A)
110. CPEI Reports
112. CPEI Report Generating Modules
114. DVIVD Event Data Match Audit Recorder
116. Approved Data Identified Process (Auto)
118. DVIVD 5 Star Auditor Working Panel Screen Interface (Form 3)
120. Non-approved Formatted CPEI Data
122. Approved Formatted CPEI Data
124. CPEI Exhibits
126. Level #1: Identified Process (Auto)
128. CPEI $1^{st}$ Data Auditing Process
130. Level #1 Effort Data Staging Area
132. Audit Level #1 Rating
134. Audit Level #2 Rating
136. Audit Level #3 Rating
138. Audit Level #4 Rating
140. Audit Level #5 Rating
141. Level #1 Rule Audit Process
142. Level #2 Rule 2 Audit Process
144. Level #3 Rule 3 Audit Process
146. Level #4 Rule 4 Audit Process
148. Level #5 Rule 5 Audit Process
150. CPEI $2^{nd}$ Data Auditing Process
152. Auditing Recorder Data
156. CPEI Data
157. - - -
158. - - -
160. CPEI 5 Star Event Data Recording Module
162. CPEI Data Match Testing Module
164. CPEI Exhibit Display Module
166. CPEI Data Repository Tables
168. CPEI Exhibit Data Repository Tables
170. CPEI Data Tables
172. Event Data Recorder Table
174. Header Component
176. CPEI Data Match Testing Component 178. CPEI Effort Line Data Component
180. 5 Star Event Data Recorder Component
182. Effort Instance Field Audit Event Data Meter
184. CPEI Generating Modules
188. DVIVD Event Data Match Audit Recorder Reporting Component
190. Header Section
191. CPEI Owner I.D.#
192. 5 Star Event Data Recorder Section
194. CPEI Audit #1 and Audit #2 Data Match Testing Section
196. Element Owner and CPEI Data Field Audit Report Section
198. Audit Light Indicators
200. Match/Mismatch Message Rollover Window
202. Green Light Indicator
204. Red Light Indicator
206. Yellow Light Indicator
208. White Light Indicator
210. CPEI Data Field Icon
212. Element Icon
214. Data Match Testing Report
216. Primary CPEI Display Module
218. Level #2 Primary CPEI
220. Level #3 Primary CPEI
222. Level #4 Primary CPEI
224. Level #5 Primary CPEI
226. Secondary Effort
228. Tertiary Effort
230. 1 Star Icon
232. 2 Star Icon
234. 3 Star Icon
236. 4 Star Icon
238. 5 Star Icon
240. Check Mark Icon
241. Secondary Star Icon
242. Auto Effort
243. Tertiary Star Icon
244. Auto Inference Association
246. Open Star Icon
248. Auto Effort (Manual or Auto) Auditing Procedure
249. DVIVD 5-Star Audit #2 Auto Effort Working Panel Screen Interface
250. Auto Effort Rules
252. 2 Open Star Rules
254. 3 Open Star Rules
256. 4 Open Star Rules
258. Auto Effort Approving Process
259. Approved Auto Effort
260. Unapproved Auto Effort
262. 2 Open Star Auto Effort
264. 3 Open Star Auto Effort
266. 4 Open Star Auto Effort
267. DVIVD 5-Star Audit #2 Secondary Effort Working Panel Screen Interface
268. Secondary Effort Rules
269. Secondary Effort Auditing Procedure
270. General DVIVD Rules
272. DVIVD Audit Level Rules
274. Project Owner Credited Rules
276. Unapproved Secondary Effort
278. Check Marked Approved Secondary Effort
280. Star Marked Approved Secondary Effort
282. Secondary Effort Approving Process
283. DVIVD 5-Star Audit #2 Tertiary Effort Working Panel Screen Interface
284. Tertiary Effort Rules
286. Tertiary Effort Auditing Procedure
288. Tertiary Effort Approving Process
290. Unapproved Tertiary Effort
292. Check Marked Approved Tertiary Effort
294. Star Marked Approved Tertiary Effort
296. Effort Instance
298. Inference
300. Element
302. People
304. Places
306. Project
308. Object
309. CPEI Domain Authority
310. Point In Phasetime (PiPT)
312. Auto Inference Association Reports
314. PP1-PP2 on PR @ PiPT
316. PP1-PL2 on PR @ PiPT
318. PP1-OB2 on PR @ PiPT
320. PL1-PP2 on PR @ PiPT
322. PL1-PL2 on PR @ PiPT
324. PL1-OB2 on PR @ PiPT
326. OB1-PP2 on PR @ PiPT
328. OB1-PL2 on PR @ PiPT
330. OB1-OB2 on PR @ PiPT
332. Data Collection Processes
334. Data Auditing Processes
336. Data Audit Level Rating Processes
338. Data Match Audit Testing Processes
340. Data Reporting Processes
342. Audit Rules
344. - - -
346. Data Approval Processes
348. System Auditor (Effortologist)
350. - - -
352. CPEI Owners
354. Effort
356. Primary CPEI
358. - - -
360. System Audit Certified Effort
362. CPEI Data Field
364. Element Data Fields
365. Element Indicator
366. VIV Icon
368. CPEI Data Match Testing Report
370. Primary Element
372. Secondary Element
374. Tertiary Element
376. Auto Inference Effort Rules
378. Reciprocating Associations

SUMMARY OF THE PRESENT INVENTION

The present invention is directed to a dynamic live dual audit system and its first and second dual audit tests recorded in real time by the method's DVIVD 5 Star Event Data Match Audit Recorder which displays audited CPEI Match and Mismatch Reports and Mismatch audit data System location. The DVIVD Match Audit System and 5 Star Event Data Recorder System Thereof insures audited reports are as inputted by the system auditor and are validated and independently verified CPEI Element Effort Event Data displays whether said data is inputted by an Element Effort Owner or generated by the System automatically from other Element inputted effort event data. The term DVIVD (Dual Validated Independently Verified Dynamic) defines that the system and method are twice validating and independently verifying the system's effort event data. The first is when the source data is input into the system's repository, and the second is when it validates and verifies that the system data that is dynamically constructed and reported from its core database matches the source data that was initially input into the system's repository. The term "CPEI" (Conjoined Project Effort Instance) is defined as a point in time when a People's role, a Place's contribution, and an Object's utilization on a Project intersect when an effort event occurs.

DETAILED DESCRIPTION OF THE PREFERRED EMBODIMENT

FIG. 1. is a hi-line diagram that illustrates the systems and processes utilized by a "DVIVD Match Audit System and 5 Star Event Data Recorder Method Thereof"; wherein said System and Method include a Data Collection Process 332, a Data Auditing Processes 334, an Approved Data Identified Process (Auto) 116, a Data Audit Level Rating Processes 336, a Data Approval Processes 346, a Data Match Audit Testing Processes 338, and a Data Reporting Processes 340

The System and Method are comprised of the Data Collection Processes 332 in which a CPEI Data 156 is collected from an Industry Data Sources 100 via a First Device (Data Collecting Computing Device) 101 and input via a Second Device (Data Reformatting Computing Device) 103 into an Industry Data Repository Database 104 via an Element Effort Event Data Inputting (Form 2) 102. The Industry Data Repository Database 104 within a Computerized Device (Data System Computing Device) 105 is the database for storing raw CPEI Data 156 in a CPEI Data Repository Tables 166, for storing a CPEI Exhibit 124 in CPEI Exhibit Data Repository Tables 168, and for storing general System data.

FIG. 1 establishes Data Approval Processes 346 in which CPEI Data 156 is migrated from the Industry Data Repository Database 104 to an Industry Core Database 106 semi-automatically based on the approval of an Audit Rules 342. Both the Data Auditing Processes 334 and the Data Approval Processes 346 are designed to ensure data integrity within the System and Method by providing tools, processes, and rules for validating and verifying data within.

FIG. 1 also defines the Industry Core Database 106 as a relational database that stores formatted CPEI Data 156 and general System data.

Figure 3:
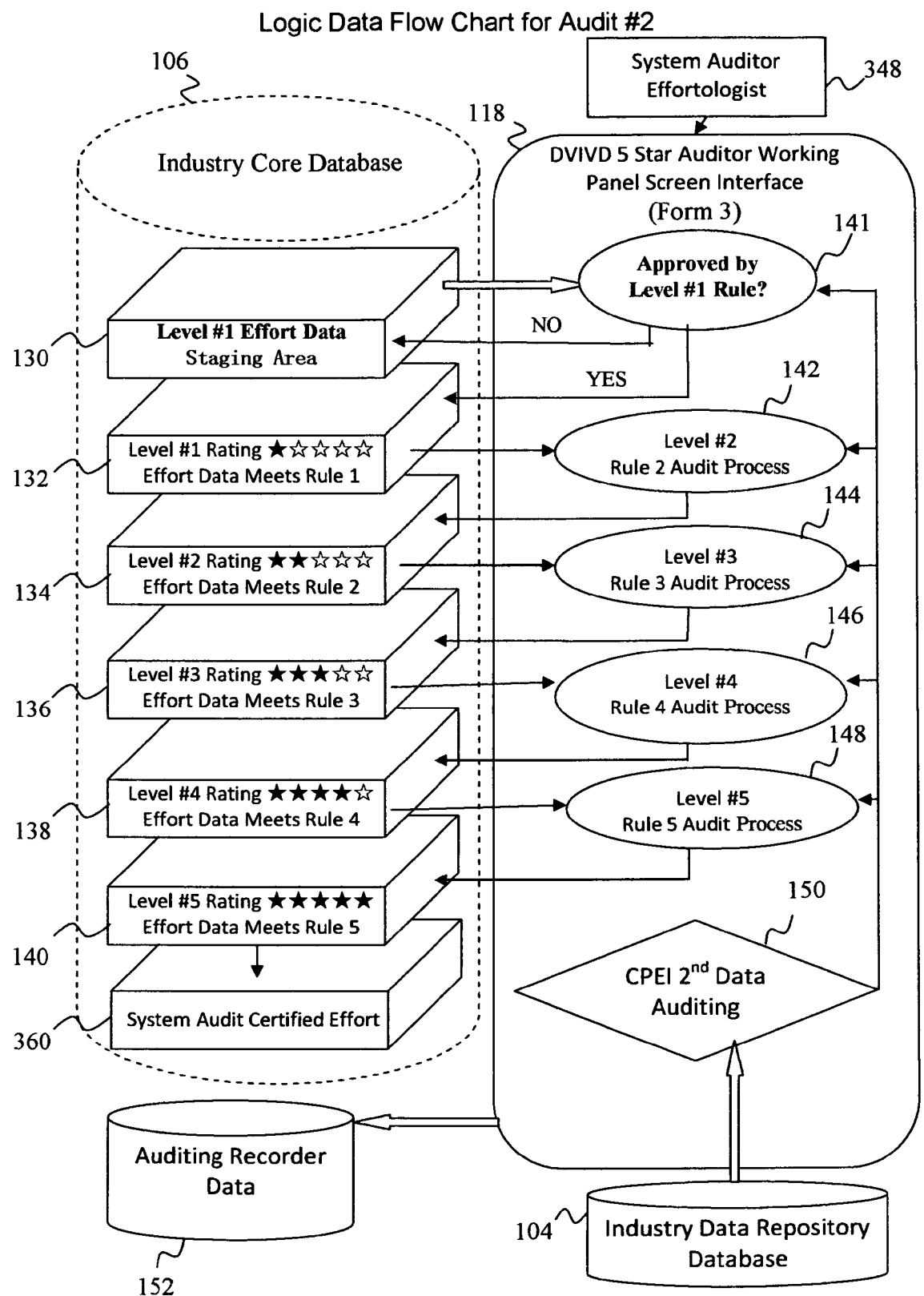
FIG. 3 is a Logic Data Flow Chart describing the CPEI Data Processing Steps in Audit #2.

FIG. 1 also details the System and Method includes Data Audit Level Rating Processes 336 of CPEI Data 156 based on an Level Rules 130 132 134 136 138 140 and an Audit Processes 141 142 144 146 148 FIG. 3 based on the result of the Data Auditing Processes 334. Furthermore, changes to Data Audit Level Rating Processes 336 are maintained by a System Auditor (Effortologist) 348 via a DVIVD 5-Star Auditor Working Panel Screen Interface (Form #3) 118 as displayed in FIG. 1.

Accordingly, FIG. 1 details Data Reporting Processes 340, wherein CPEI Data 156 is displayed within a CPEI Report 110 (Conjoined Project Effort Instance Report). This process is facilitated by a CPEI Report Generating Modules 112.

Finally, FIG. 1 details that Data Match Testing Processes 338 are facilitated by a DVIVD Event Data Match Audit Recorder 114, wherein the DVIVD Event Data Match Audit Recorder 114 is an interactive tool used by the System Auditor 348 in the facilitation of the Data Auditing Processes.

Figure 2:
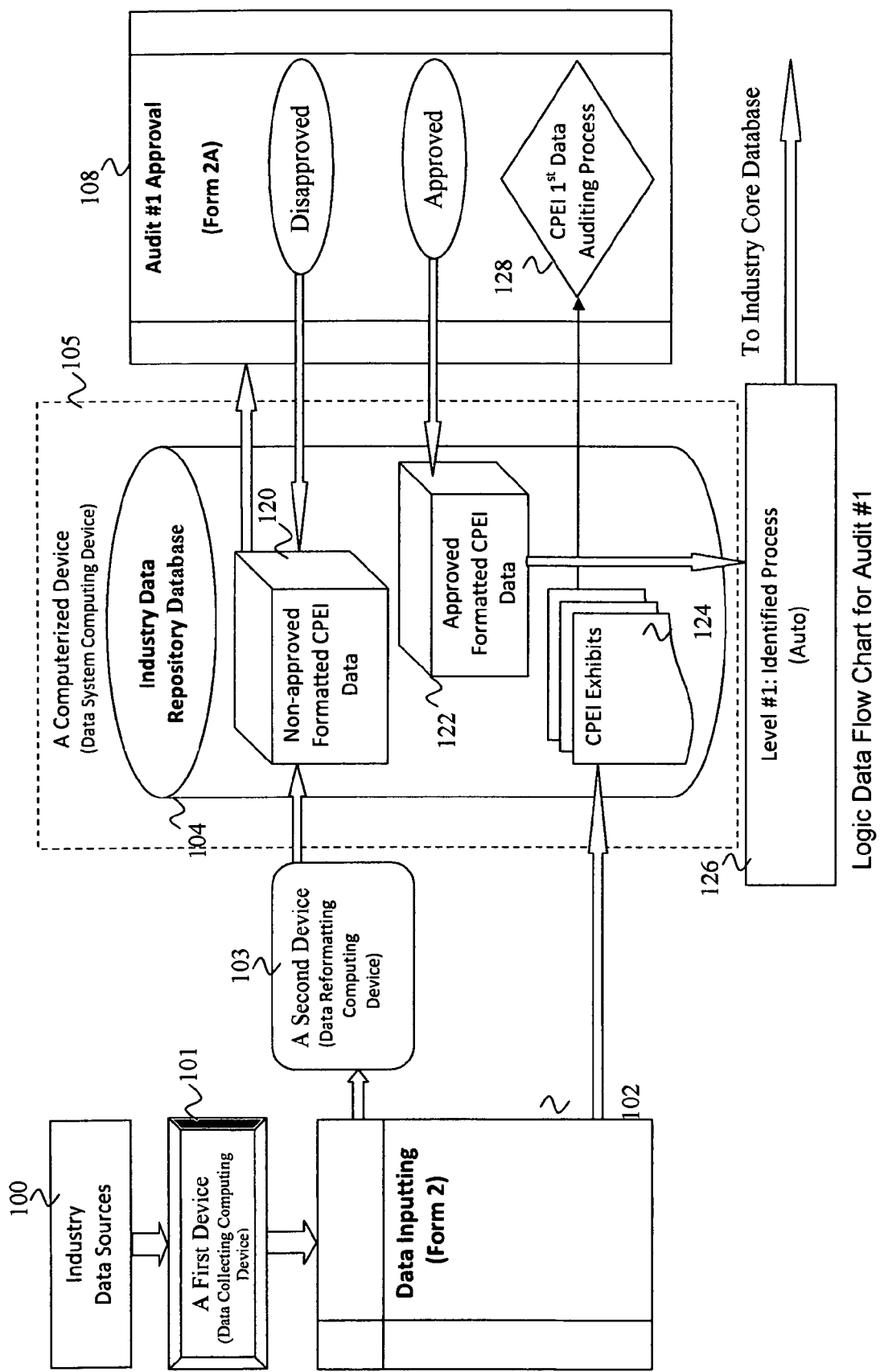
FIG. 2 illustrates the data collecting and data approval processes utilized by the DVIVD Match Audit System and 5 Start Data Recorder Method Thereof.

FIG. 2 illustrates the data collecting and data approval processes utilized by the "DVIVD Match Audit System and 5 Star Event Data Recorder Method Thereof".

The System is comprised of the Data Collection Processes 332 in which CPEI Data 156 and Industry Data Sources 100 are received via the First Device (Data Collecting Computing Device) 101 and are input into the Industry Data Repository Database housed in Computerized Device (Data System Computing Device) 105 via Data Inputting Form 2 utilizing the Second Device (Data Reformatting Computing Device) 103.

Industry Data Sources 100 which provide the CPEI Data are now used by a CPEI $1^{st}$ Data Auditing Process 128 to validate and verify the submitted CPEI Data 156 so it can be moved along to a Level #1: Identified Process (Auto) 126. The Industry Data Sources 100 may include, but are not limited to the following:
 web sites
 resume databases
 online resumes
 print media
 third party databases
 private resources During the Data Collection Processes 332, Element Effort Event Data Inputting (Form 2) 102 is used by the Second Device (Data Reformatting Computing Device) 103 to format raw data into usable CPEI Data 156 that will eventually be migrated into the Industry Core Database 106 in Computerized Device (Data System Computing Device) 105. The Industry Data Source 100 will be preserved as CPEI Exhibit 124 which is stored in the Industry Data Repository Database 104 to be used as a means for validating and verifying CPEI Data 156.

FIG. 2 further establishes the Data Approval Process 346 in which the CPEI Data 156 is either designated as an Approved Formatted CPEI Data 122 or a Non-Approved Formatted CPEI Data 120. CPEI Data 156 must be approved before it can be migrated from the Industry Data Repository Database 104 to the Industry Core Database 106. Data Approval Process 346 is a semi-automated process by which the System Auditor 348 reviews the CPEI Data 156 according to established Audit Rules 342. Data Approval Process 346 is facilitated by an Audit #1 Approval (Form 2A) 108.

FIG. 3 illustrates various processes within the "DVIVD Match Audit System and 5 Star Event Data Recorder Method Thereof" relating to the management of Data Audit Level Rating Processes 336 that occur via the DVIVD 5 Star Auditor Working Panel Screen Interface (Form 3) 118.

According to FIG. 3, the System and Method Thereof are comprised of the Data Audit Level Rating Processes 336 facilitated by System Auditors 348 via DVIVD 5 Star Auditor Working Panel Screen Interface (Form 3) 118. A Data Audit Level Rating Processes 336 are used to:
 Review the Audit Level Rating 132 134 136 138 140 of CPEI Report 110, along with validation and verification, using CPEI Exhibits 124 and Level Rules Audit Processes 141, 142, 144, 146, 148.
 Review level change requests made by a CPEI Owners 352, owners of CPEI Reports 110;
 Review new CPEI Exhibits 124 that support upgrading Audit Level Ratings 132 134 136 138 140;
 Approve or reject Audit Level Ratings 132 134 136 138 140 according to Level Rules Audit Processes 141 142 144 146 148.

FIG. 3 defines that Data Audit Level Rating Processes 336 include a system by which the CPEI Report 110 Audit Level Rating 132 134 136 138 140 is raised as more an Elements 300 are fulfilled.

FIG. 3 details the System and Method Thereof assigns the Audit Level #1 Rating 132 to CPEI Report 110 when Audit Level #1 Rules 141 have been satisfied.

FIG. 3 details the System and Method Thereof assigns the Level #2 Rating 134 to CPEI Report 110 when Level #2 Rule 2 Audit Process 142 has been satisfied.

FIG. 3 details the System and Method Thereof assigns the Level #3 Rating 136 to CPEI Report 110 when Level #3 Rule 3 Audit Process 144 has been satisfied.

FIG. 3 details the System and Method Thereof assigns the Level #4 Rating to CPEI Report 110 when Level #4 Rule 4 Audit Process 146 has been satisfied.

FIG. 3 further details that the System and Method Thereof assigns the highest Audit Level #5 Rating 140, a System Audit Certified Effort 360, to CPEI Report 110 when Level #5 Rule 5 Audit Process 148 has been satisfied.

Figure 4:
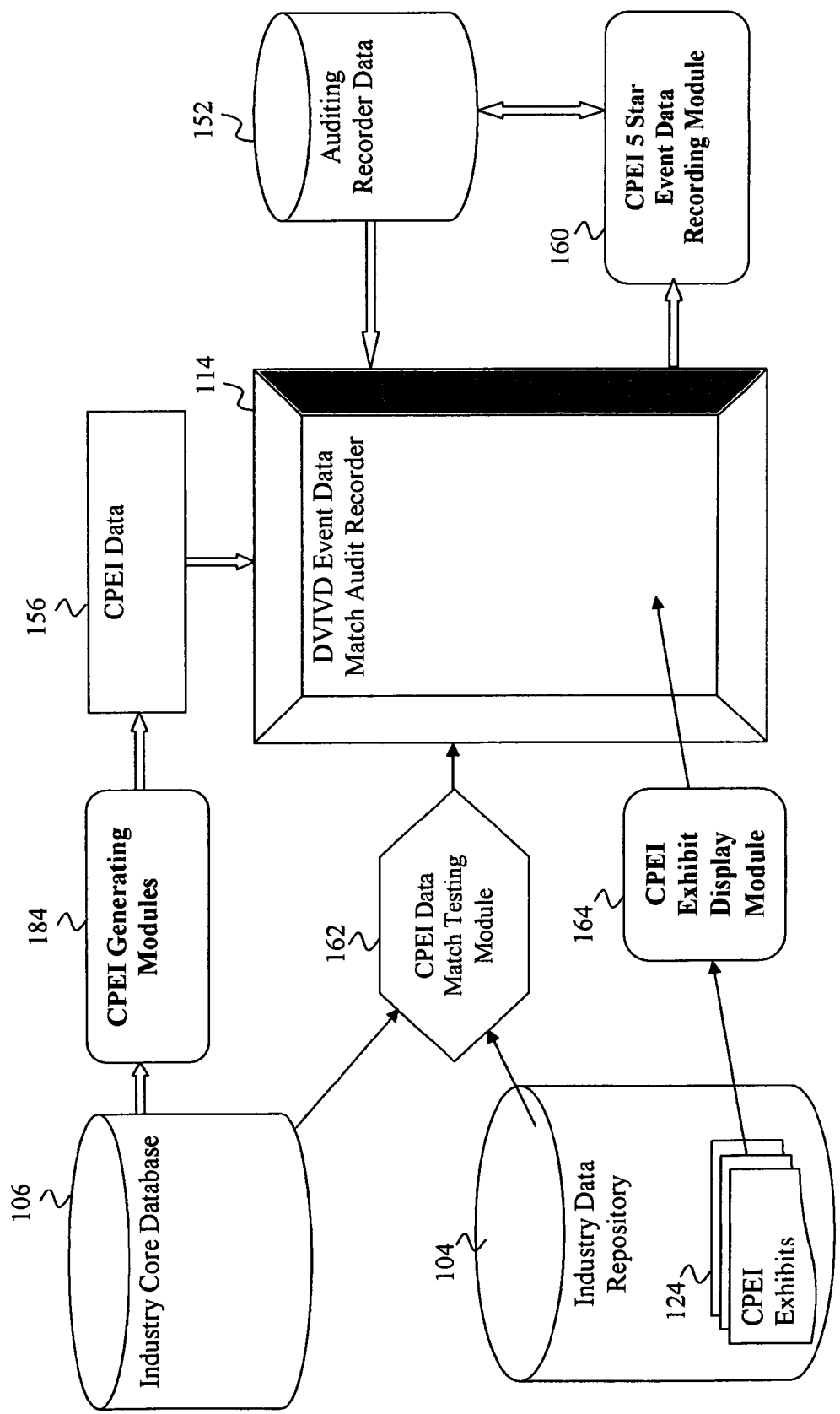
FIG. 4 displays all the databases and modules used by the DVIVD Event Data Match Audit Recorder.

FIG. 4 displays all of the databases and modules used in the DVIVD Event Data Match Audit Recorder 114 as they relate to the various Data Auditing Processes 334 that occur as part of the DVIVD Match Audit System and 5 Star Event Data Recorder Method Thereof.

According to FIG. 4, as CPEI Data 156 moves throughout the Industry Databases, Industry Data Repository Database 104 and Industry Core Database 106, it encounters a number of Data Auditing Processes 334, the sum of which provides the infrastructure for the DVIVD Event Data Match Audit Recorder 114 Data Match Audit Processes 338 and Data Reporting Processes 340.

FIG. 4 details the Data Auditing Processes 334 provide a verification and validation process in which CPEI Data 156 is logged when it firsts enters the System in the Industry Data Repository Database 104, logged when the CPEI Data 156 is migrated to the Industry Core Database 106, logged when CPE Audit Level Rating 132 134 136 138 140 changes occur, and logged when the CPEI Data 156 is dynamically reported from the Industry Core Database 106.

FIG. 4 also details that the System is comprised of, but not limited to, the following auditing modules:

A CPEI 5 Star Event Data Recording Module 160: A module which generates an Auditing Recorder Data 152.

A CPEI Generating Modules 184: Modules that will generate and display CPEI Data 156 visually.

A CPEI Data Match Testing Module 162: Modules that will compare data from the Industry Data Repository Database 104 against data reported from the Industry Core Database 106 and display match or mismatch results within the DVIVD Event Data Match Audit Recorder 114.

A CPEI Exhibit Display Module 164: A module that displays those CPEI Exhibits 124 used to validate/verify CPEI Reports 110.

FIGS. 1 & 4 detail how the Industry Data Repository Database 104 is used to store CPEI Data 156, which includes CPEI Exhibits 124. Said CPEI Exhibits 124 can be accessed and displayed within the DVIVD Event Data Match Audit Recorder 114 as a means for validating CPEI Data 156 and CPEI Reports 110.

FIG. 4 expands on this by detailing that the CPEI Data Match Testing Module 162 is the main component for executing the two main Data Auditing Processes 334 of the System and Method, which include but are not limited to:

CPEI $1^{st}$ Data Auditing Process 128: a semi-automated process by which the CPEI Data 156 is logged as it is entered into the Industry Data Repository Database 104.

A CPEI $2^{nd}$ Data Auditing Process 150: a fully automated process by which the CPEI Data 156 is logged as reported from the Industry Core Database 106 so that it may be audited against CPEI Data 156 as inputted into the Industry Data Repository Database 106.

Figure 5:
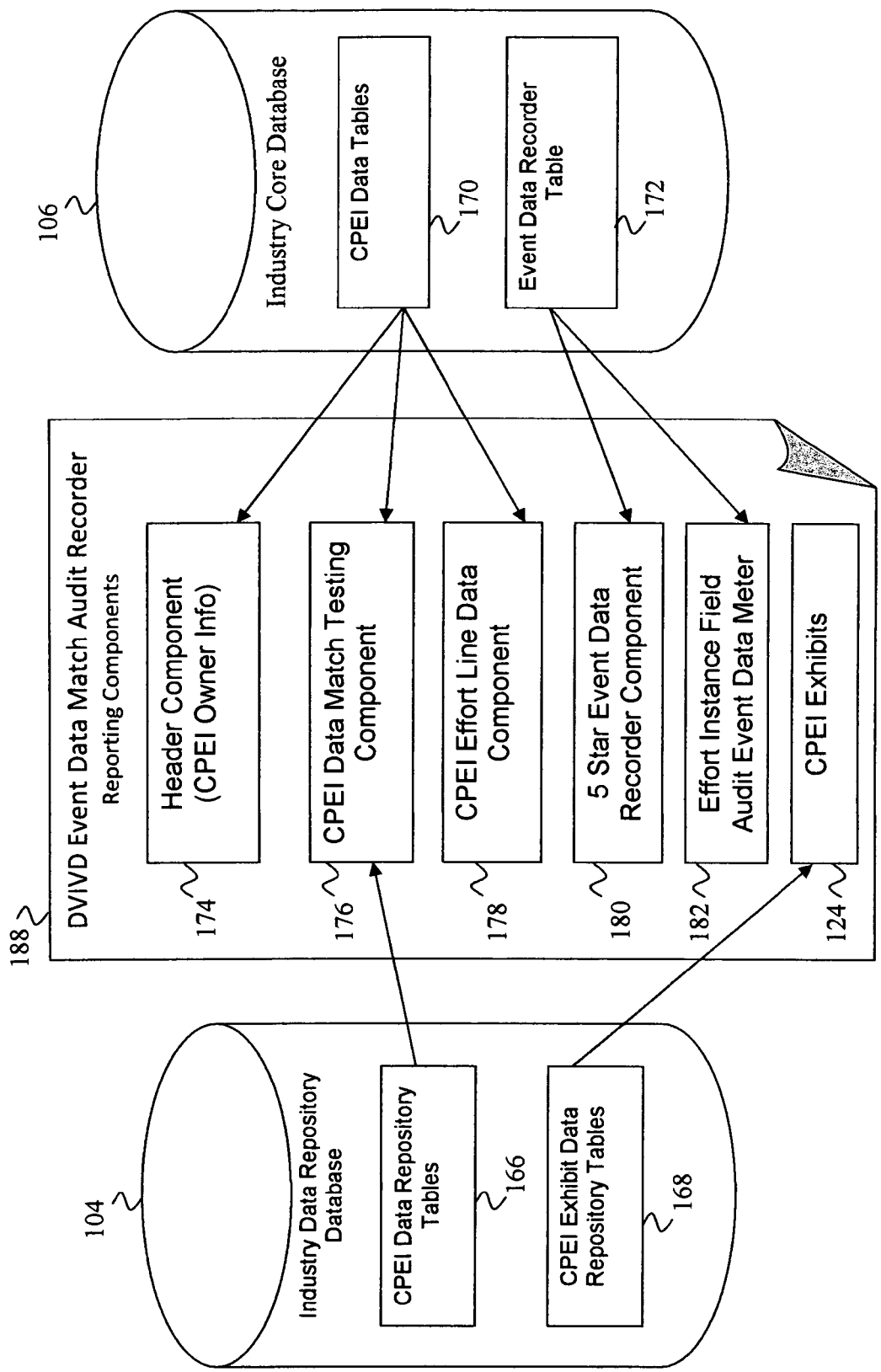
FIG. 5 displays the reporting components of the DVIVD Event Data Match Audit Recorder.
Figure 7A:
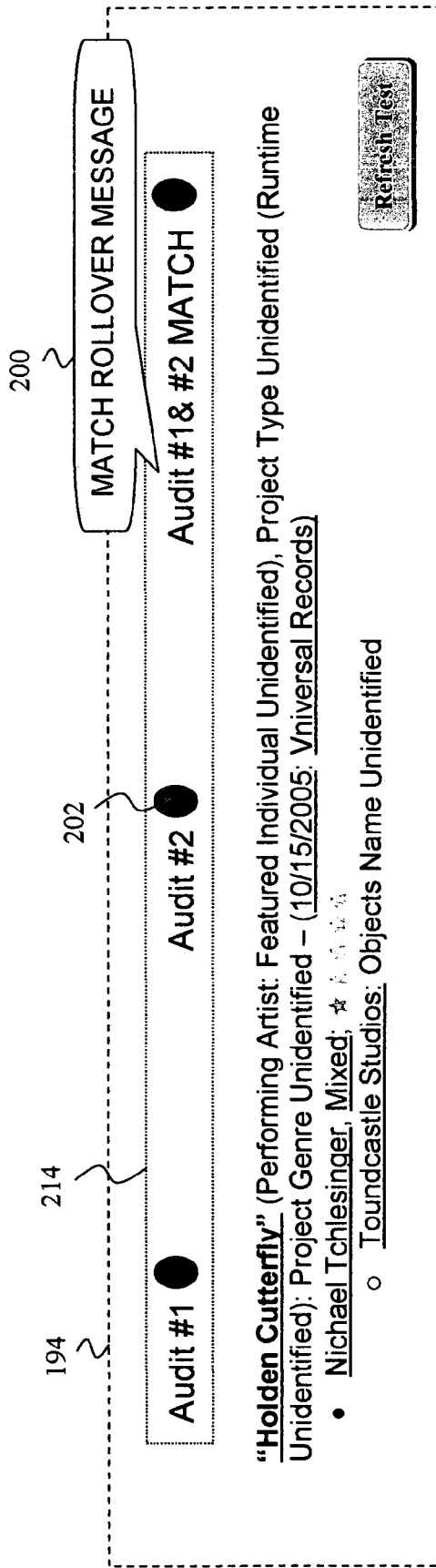
FIG. 7 displays the CPEI Audit #1 and Audit #2 Data Match Testing Section of the DVIVD Event Data Match Audit Recorder.
Figure 7B:
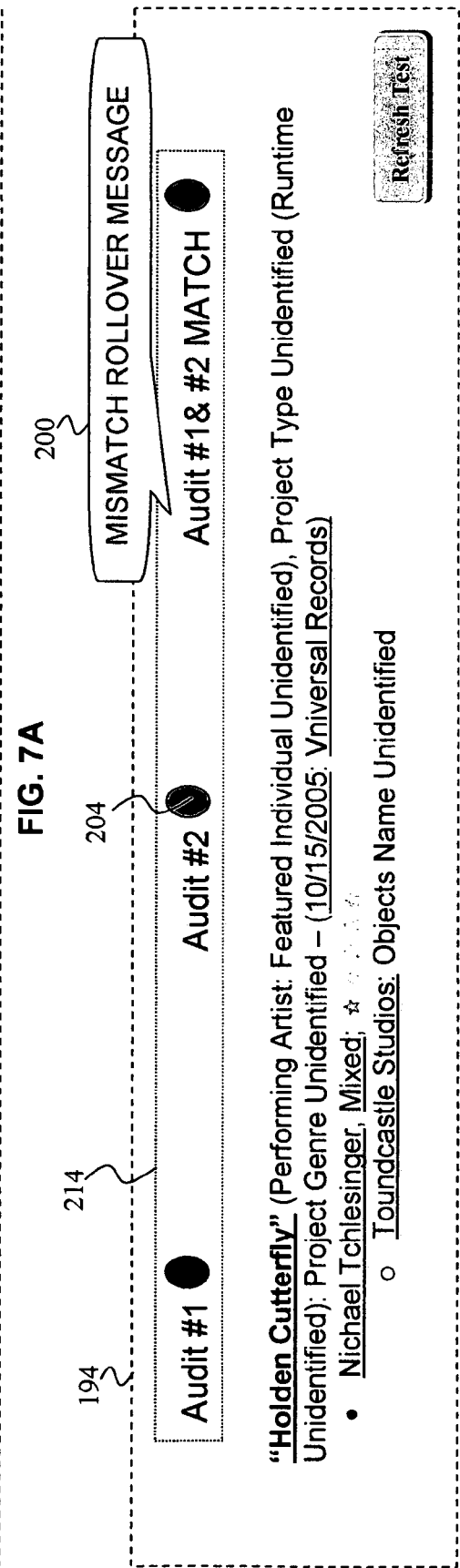
Figure 7C:
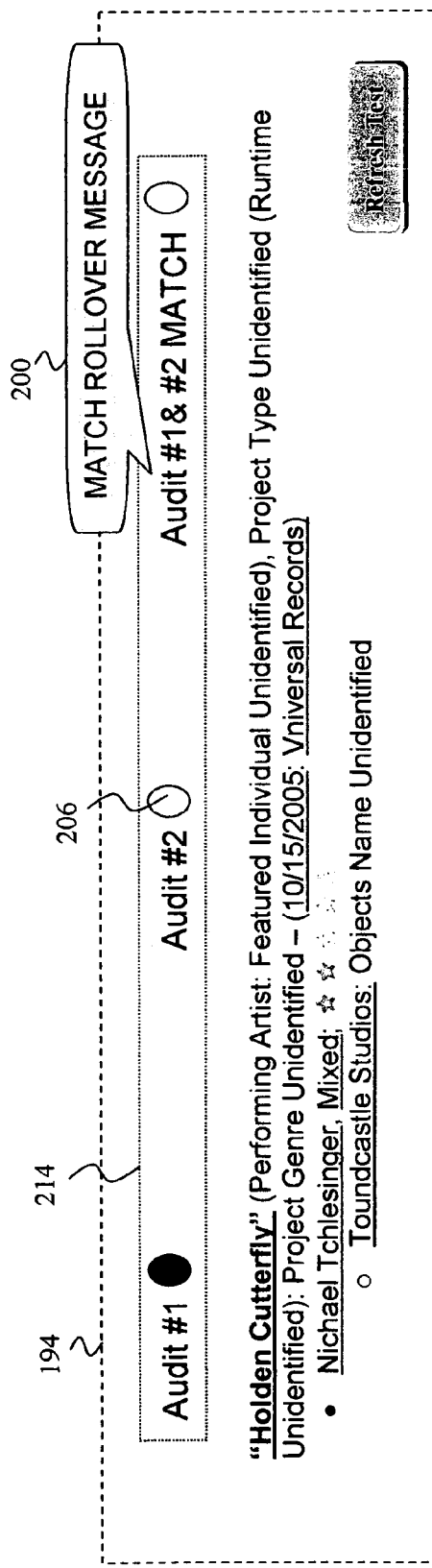
Figure 7D:
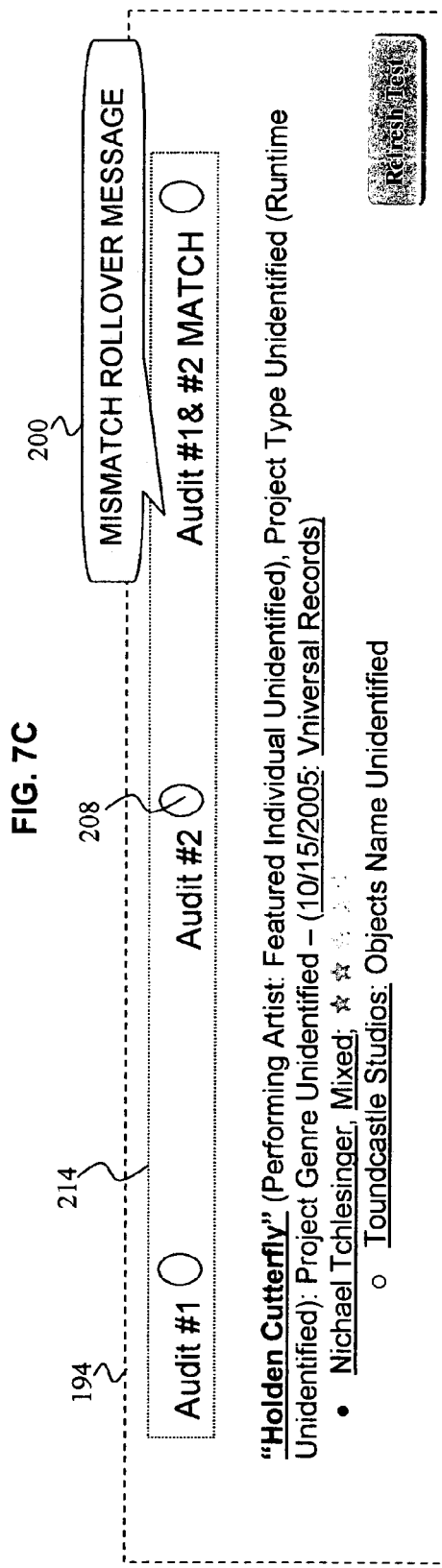

The results of the CPEI Data Match Testing Module 162 are displayed within the DVIVD Event Data Match Audit Recorder 114 within a CPEI Data Match Testing Component 176 see FIG. 5.

FIG. 4 also details how CPEI Data 156 is extracted from the Industry Core Database 106 via the CPEI Generating Module 184 and used in a number of dynamic reports. CPEI Generating Modules 184 are used in the Data Auditing Processes 334 by generating and displaying CPEI Data 156 within the DVIVD Event Data Match Audit Recorder 114.

FIG. 5 displays a DVIVD Event Data Match Audit Recorder Reporting Components 188 as they relate to the System and Method Thereof. Said reporting components/ modules include, but are not limited to, the following:

A Header Component 174: A component of the DVIVD Event Data Match Audit Recorder 114 that displays CPEI Owner 352 basic Information reported from a CPEI Data Tables 170 which reside in the Industry Core Database 106.

CPEI Data Match Testing Component 176: A component displaying the CPEI $1^{st}$ Data Auditing Process 128 and CPEI $2^{nd}$ Data Auditing Process 150 testing results. The testing results display a match or mismatch between CPEI Data 156 reported from the Industry Core Database 106 and CPEI Data 156 inputted into the Industry Data Repository Database 104.

A CPEI Effort Line Data Component 178: A component that visually displays CPEI Report 110 of the CPEI Owner 352. Said CPEI Report 110 is generated dynamically from the CPEI Data Tables 170 within the Industry Core Database 106.

A 5 Star Event Data Recorder Component 180: A component that displays the Audit Level Rating 132 134 136 138 140 details which includes 1) the Audit Level Rating 132 134 136 138 140 at which the CPEI Report 110 is currently rated, one to five Stars; and 2) the dates at which the Audit Level Rating 132 134 136 138 140 was achieved. The Audit Level Rating 132 134 136 138 140 data is dynamically reported from an Event Data Recorder Table 172 of the Industry Core Database 106.

An Effort Instance Field Audit Event Data Meter 182: A component that displays the status of all Elements 300 and CPEI Data Fields 362 in the CPEI Report 110. This status data is extracted from the Event Data Recorder Table 172 of the Industry Core Database 106.

CPEI Exhibits 124: A component that displays all of the CPEI Exhibits 124 used to validate and verify the CPEI Report 110. The CPEI Exhibits 124 are stored within the Industry Data Repository Database 104.

FIG. 6 is a visual representation of the DVIVD Event Data Match Audit Recorder 114 according to the preferred embodiment of the DVIVD Match Audit System and 5 Star Event Data Recorder Method Thereof.

FIG. 6 displays the various reporting sections within the DVIVD Event Data Match Audit Recorder 114 which can include, but are not limited to, the following:

1. A Header Section 190
2. A 5 Star Event Data Recorder Section 192
3. A CPEI Audit #1 and Audit #2 Data Match Testing Section 194
4. An Element Owner and CPEI Data Field Audit Report Section 196

FIG. 6 displays the Header Section 190 is used to report the CPEI Owner 352 general data along with general CPEI information. This can include, but is not limited to, the following:

1. CPEI Owner's 352 name
2. CPEI Owner 352 Core Database 106 ID#
3. CPEI Report 110 ID#

The function of the 5 Star Event Data Recorder Section 192 is to report the Audit Level Rating 132 134 136 138 140 of the reported CPEI Report 110 and the date on which it was achieved. The Audit Level Rating 132 134 136 138 140 is depicted by a Star Icon 230 232 234 236 238 or a Check Mark Icon 240. The date the Audit Level Rating 132 134 136 138 140 was achieved is depicted by displaying MM/DD/YYYY in a field next to the corresponding Star Icon 230 232 234 236 238 or Check Mark Icon 240.

The 5 Star Event Data Recorder Section 192 in FIG. 6 displays an example of the DVIVD Event Data Match Audit Recorder 114 for a Primary CPEI 356 at Audit Level #1 Rating 136. However, the DVIVD Event Data Match Audit Recorder 114 is designed to facilitate Primary CPEIs 356 as well as a Secondary Efforts 226, a Tertiary Efforts 228, an Auto Efforts 242, and an Auto Inference Associations 244 at a variety of Audit Level Ratings 132 134 136 138 140. It should therefore be noted that both the Header Section 190 and 5 Star Event Data Recorder Section 192 will be reported differently based on CPEI type and the current Audit Level Rating 132 134 136 138 140.

FIG. 7 displays the CPEI Audit #1 and Audit #2 Data Match Testing Section 194 of the DVIVD Event Data Match Audit Recorder 114 according to the preferred embodiment of the DVIVD Match Audit System and 5 Star Event Data Recorder Method Thereof.

According to FIG. 7, the CPEI Audit #1 and Audit #2 Data Match Testing Section 194 is used to display the Data Match Audit Testing Process 338 results that have occurred between the CPEI 1$^{st}$ Data Auditing Process 128 and CPEI 2$^{nd}$ Data Auditing Procedure 150. This is indicated by an Audit Light Indicators 198 FIG. 9 in a Data Match Testing Report 214 which details the results according to the following a. A Green Light Indicator 202 indicates that the CPEI Report 110 has passed the Data Match Audit Testing Process 338.

b. A Red Light Indicator 204 indicates that the CPEI Report 110 has not passed the Data Match Audit Testing Process 338 and is reporting a mismatch.

c. A Yellow Light Indicator 206 indicates that the CPEI Data 156 has not been validated or verified by the CPEI Owner 352.

d. A White Light Indicator 208 indicates that Data Auditing Processes 334 have not been performed on the CPEI Report 110.

According to FIG. 7, a Match/Mismatch Rollover Window 200 will appear when a viewer rolls over or mouses over the Audit Light Indicators 198 within the CPEI Audit #1 and Audit #2 Data Match Testing Section 194. The Match/Mismatch Rollover Message Window 200 is used to detail a summary audit report as to the audit status of the CPEI 110.

FIG. 7 displays two examples of the CPEI Audit #1 and Audit #2 Data Match Testing Section 194. FIG. 7A is displaying a match, indicated by the Green Light Indicators 202, and FIG. 7B is displaying a mismatch, indicated by the Red Light Indicators 204. The CPEI Audit #1 and Audit #2 Data Match Testing Section 194 will be reported differently based on the status of any given CPEI Report 110.

Figure 8:
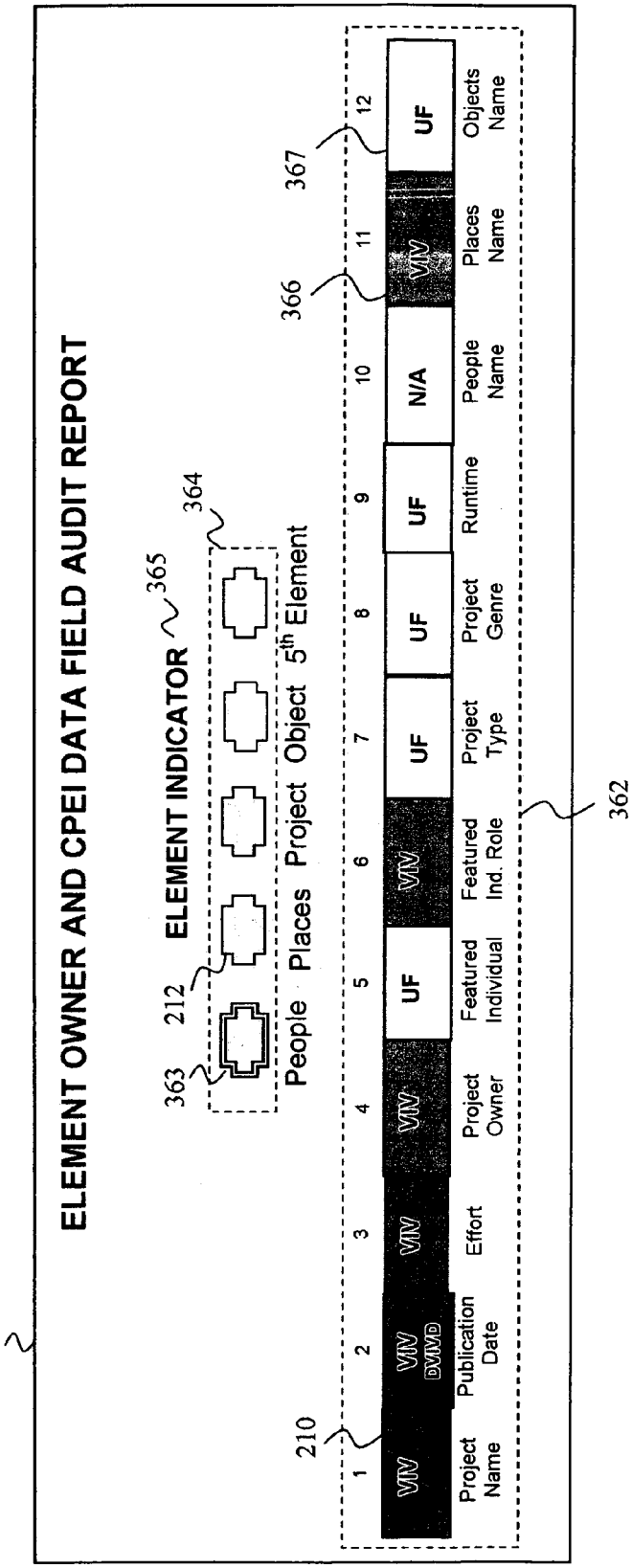
FIG. 8 displays the Element Owner and Formulaic Data Field Audit Report Section of the DVIVD Event Data Match Audit Recorder.

FIG. 8 displays the Element Owner and CPEI Data Field Audit Report Section 196 of the DVIVD Event Data Match Audit Recorder 114 according to the preferred embodiment of the DVIVD Match Audit System and 5 Star Event Data Recorder Method Thereof.

According to FIG. 8, the Element Owner and CPEI Data Field Audit Report Section 196 is used to display:

An Element Indicator 365 indicates to which Element 300 a reported Effort 354 belongs by displaying a double framed icon;

The Element Indicator 365 also indicates an Element Data Field 364 that has been fulfilled or not fulfilled;

The CPEI Data Fields 362 that appear within the Primary CPEI 356, the Secondary Efforts 226, the Tertiary Efforts 228, Auto Efforts 242 and Auto Inference Association 244;

Those CPEI Data Fields 362 that have been validated and verified;

Those CPEI Data Fields 362 that have not been validated and verified; and

Links to those CPEI Exhibits 124 used in the validation and verification of the CPEI Data Field 362.

According to FIG. 8, a CPEI Data Field Icons 210 for CPEI Data Fields 362 currently fulfilled are highlighted. FIG. 8 details that an Element Icons 212 are highlighted when the corresponding Element 300 has System Auditor 348 approved association to a Project 306 which is the subject of the CPEI Report 110.

FIG. 8 illustrates that CPEI Data Field 362 displayed within the Element Owner Indicator and CPEI Data Field Audit Report Section 196 may contain a VIV Icon 366 indicating that the corresponding CPEI Data Field 362 has been validated and independently verified by an approved CPEI Exhibit 124.

FIG. 8 illustrates the Primary CPEI 356 with Audit Level #3 Rating 136. However, the DVIVD Event Data Match Audit Recorder 114 is designed to facilitate Primary CPEI 356 as well Secondary Efforts 226, Tertiary Efforts 228, Auto Efforts 242, and Auto Inference Associations 244 at a variety of Audit Level Ratings 132 134 136 138 140.

Figure 9:
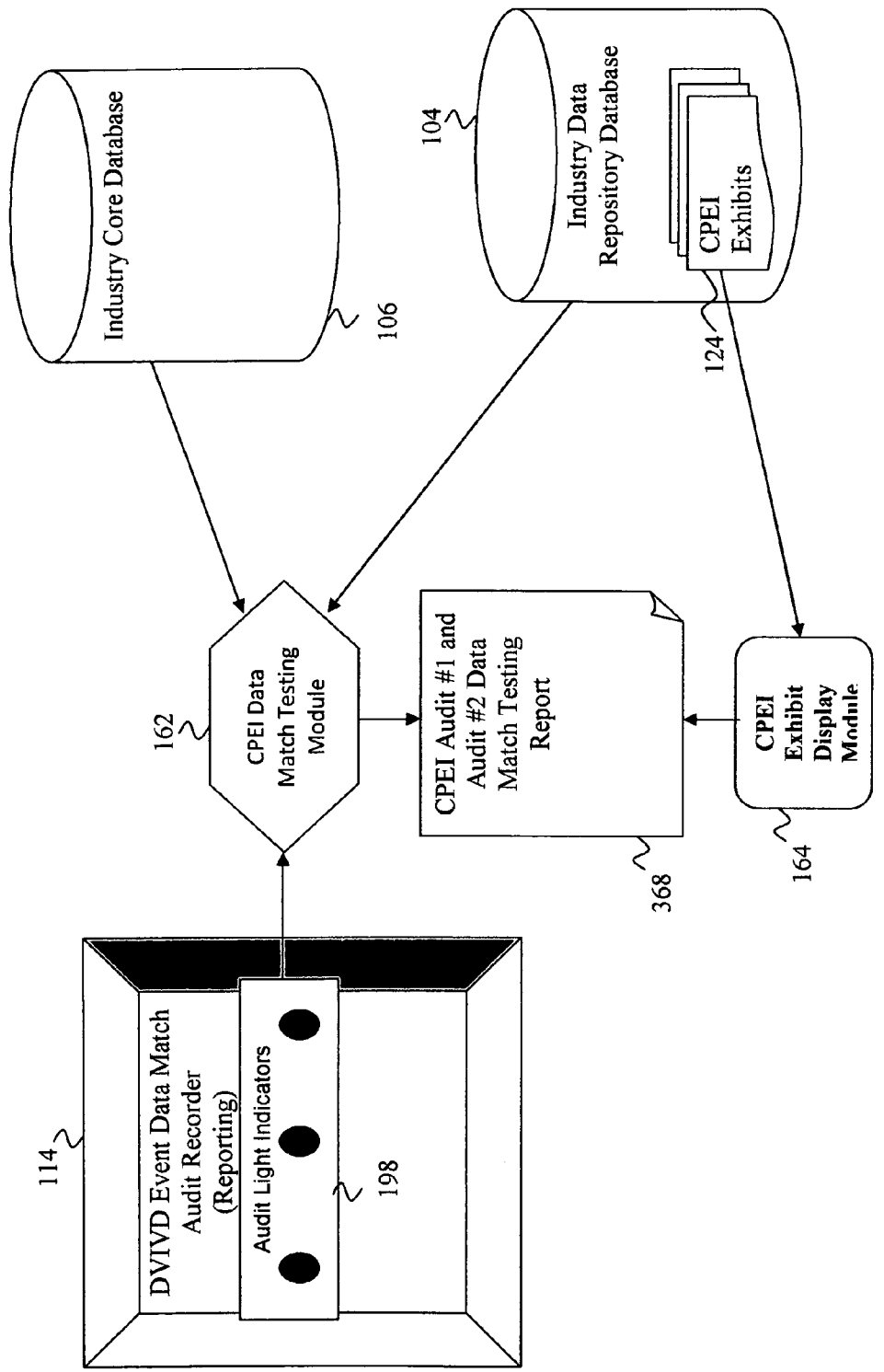
FIG. 9 displays the CPEI Data Match Testing Processes and Data Match Testing Reporting components of the DVIVD Event Data Match Audit Recorder.

FIG. 9 is a high line diagram that details the parameters and processes used to provide the Data Match Audit Testing Processes 338 of the DVIVD Event Data Match Audit Recorder 114 as related to the CPEI Audit #1 and Audit #2 Data Match Testing Section 194 use of the Audit Light Indicators 198.

According to FIG. 9, the CPEI Data Match Testing Module 162 compares CPEI Data 156 from both the Industry Data Repository Database 104 and the Industry Core Database 106. This information is used by CPEI 1$^{st}$ Data Auditing Process 128 and CPEI 2$^{nd}$ Data Auditing Process 150, whereby the CPEI Data Match Testing Module 162 uses those CPEI Exhibits 124 stored within the Industry Data Repository Database 104 as a means for said comparison.

CPEI Data Match Testing Module 162 is used to generate a CPEI Data Match Testing Report 368 that will include the CPEI Exhibits 124 for reference. Said CPEI Data Match Testing Report 368 includes the Audit Light Indicators 198 within the CPEI Audit #1 and Audit #2 Data Match Testing Section 194 of the DVIVD Event Data Match Audit Recorder 114. In addition, the specific details of said CPEI Data Match Testing Report 368 are displayed within a Match/Mismatch Message Rollover Window 200 that appears whenever a viewer rolls over the Match/Mismatch Light Indicators 198.

Figure 10:
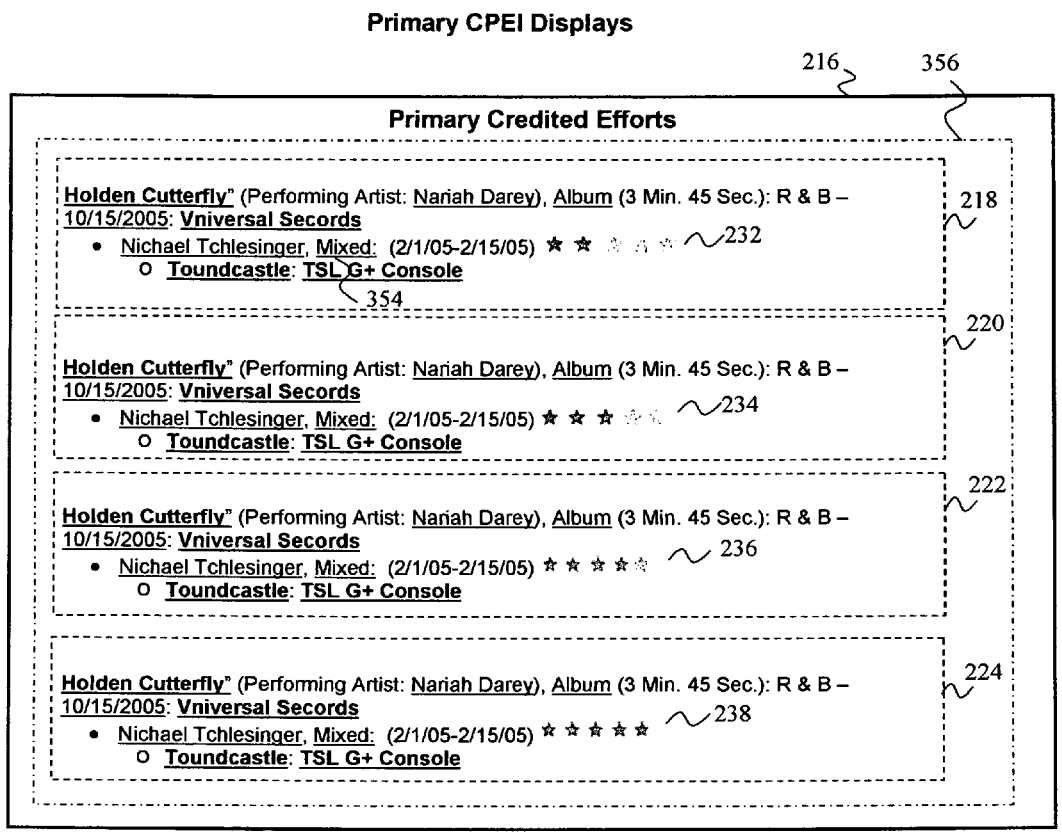
FIG. 10 is an example of a report displaying a Primary Effort.

FIG. 10 illustrates an example of Primary CPEI 356 displays with their corresponding Audit Level Rating 132 134 136 138 140. FIG. 10 is an extension of FIG. 3, wherein FIG. 10 visually displays multiple Primary CPEIs 356 according to the following:

A Level #2 Primary CPEI 218: Primary CPEIs 356 will be reported with the 2 Star Icon 232 when Level #2 Rule 2 Audit Process 142 has been met and approved by System Auditor 348 as defined within FIG. 3.

A Level #3 Primary CPEI 220: Primary CPEIs 356 will be reported with the 3 Star Icon 234 when Level #3 Rule 3 Audit Process 144 has been met and approved by System Auditor 348 as defined within FIG. 3.

A Level #4 Primary CPEI 222: Primary CPEIs 356 will be reported with the 4 Star Icon 236 when Level #4 Rule 4

Audit Process 146 has been met and approved by System Auditor 348 as defined within FIG. 3.

A Level #5 Primary CPEI 224: Primary CPEIs 356 will be reported with the 5 Star Icon 238 when Level #5 Rule 5 Audit Process 148 has been met and approved by System Auditor 348 as defined within FIG. 3.

FIG. 11 illustrates an example of a report displaying Secondary Effort 226 and Tertiary Effort 228 displays. FIG. 11 is an extension of FIGS. 14 and 15, wherein FIG. 11 visually displays the Secondary Effort 226 and Tertiary Effort 228 that are a result of the Data Auditing Processes 334 defined in FIGS. 14 and 15:

Secondary Effort 226 Display: Secondary Efforts 226 will be reported with Check Mark Icon 240 when Element 300 has an approved association to a Primary Element 370, wherein said association supported the Primary Element 370 in achieving their Primary CPEI 356, see FIG. 14 and corresponding specifications.

Tertiary Effort 228 Displays: Tertiary Efforts 228 will be reported with Check Mark Icon 240 when Element 300 has an approved association to a Secondary Element 372, wherein said association assisted the Secondary Element 372 in achieving their Secondary Effort 226, see FIG. 15 and corresponding specifications.

Figure 12A:
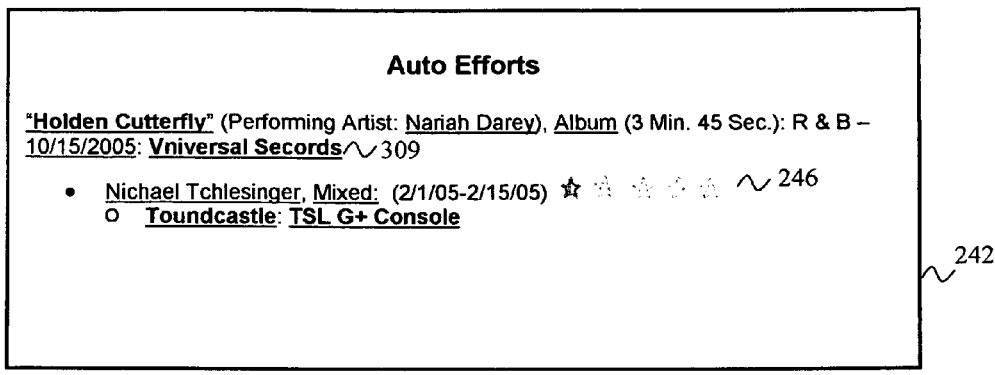
FIG. 12 is an example of a report displaying an Auto Effort and an Auto Inference Association.
Figure 12B:
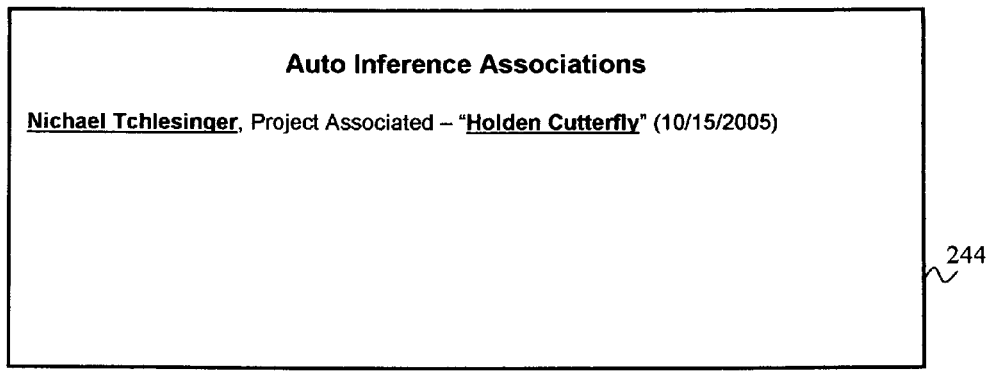
Figure 13:
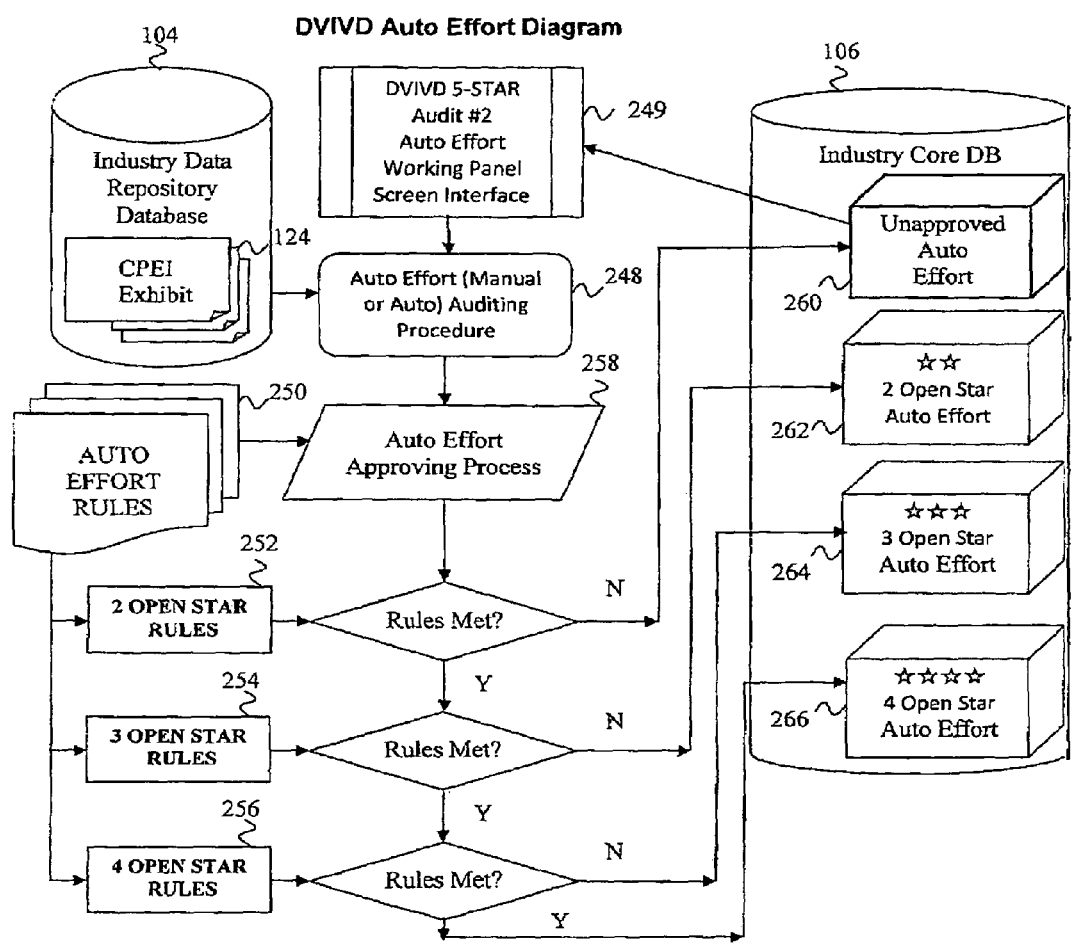
FIG. 13 describes the DVIVD Match Audit System and 5 Star Event Data Recorder Method Thereof with regard to the approval of Auto Efforts.

FIG. 12 illustrates an example of a report displaying Auto Effort 242 and Auto Inference Association 244 displays. FIG. 12 is an extension of FIGS. 13 and 16, wherein FIG. 12 visually displays the Auto Effort 242 and Auto Inference Association 244 displays that are a result of the Data Auditing Processes 334 defined in FIGS. 13 and 16:

Auto Efforts 242 will be reported with an Open Star Icon 246, an outline of a star that is not filled in, according to an Auto Effort Rules 250 defined in FIG. 13.

Figure 16:
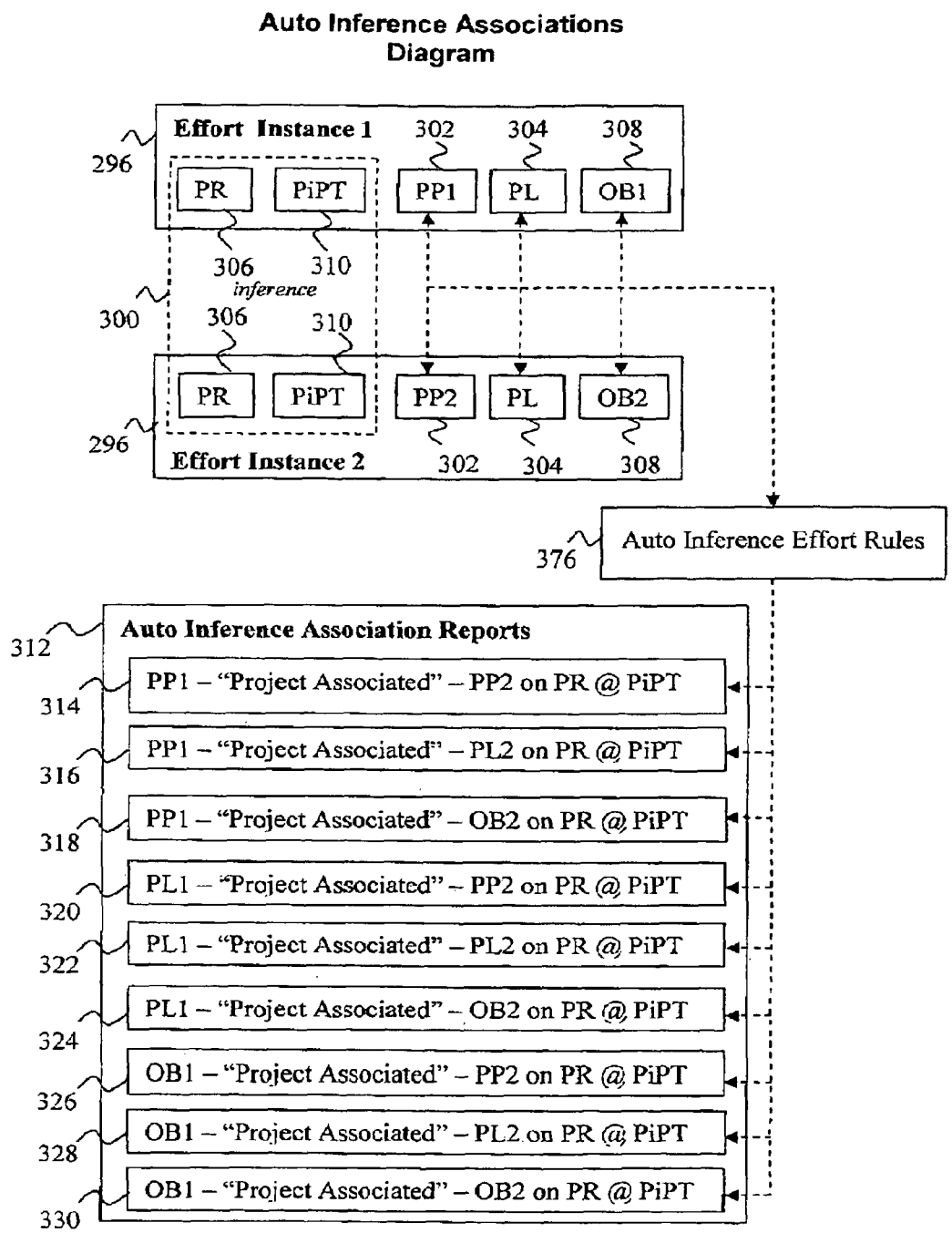
FIG. 16 describes the specific DVIVD Match Audit System and 5 Star Event Data Recorder Method for generating Auto Inference Associations.

Auto Inference Associations 244 will be reported according to an Auto Inference Effort Rules 376 defined in FIG. 16.

FIG. 13 illustrates the DVIVD Match Audit System and 5 Star Event Data Recorder Method Thereof with regard to the approval of Auto Efforts 242.

FIG. 13 details how the System and Method validate and verify Auto Effort 242 data. Auto Efforts 242 conform to the following Auto Effort Rules 250:

Auto Efforts 242 are automatically generated by the System as a result of a Reciprocating Association 378 entered into the System by Element 300 other than the owner. This includes the reporting of Auto Efforts 242 when the Project 306 enters Elements 300 who worked on the Project 306.

Auto Efforts 242 must pass through an Auto Effort, Manual or Auto, Auditing Procedure 248, even though the Auto Efforts 242 have not yet gone through the main Data Auditing Processes 334 that pertain to Primary CPEIs 356.

Auto Efforts 242 are reported with Open Star Icons 246, the number of which are dependent on the number of Elements 300 that are associated and displayed in the Auto Effort 242 according to Level Rules Audit Processes 141 142 144 146 148.

Auto Efforts 242 may be generated by the System and Method Thereof via Reciprocating Associations 378. For example, if a People 302 Element 300 inputs they used an Object 308 Element 300 on the Project 306, the Object 308 Element 300 will automatically receive Auto Effort 242 reporting it was used by the People 302 on the Project 306.

Auto Efforts 242 can be reported with a minimum of two Elements 300 when the Project 306, which is a CPEI Domain Authority 309, submits an Element 300 had Effort 354 on the Project 306.

As more Element Data Fields 364 are fulfilled in the Auto Effort 242, the number of Open Star Icons 246 will increase. In other words, the Open Star Icons 246 will accumulate until all the Element Data Fields 364 are fulfilled.

Auto Efforts 242 cannot become Primary CPEIs 356 until such time as the CPEI Owner 352 becomes a participant in the System and agrees to the Effort 354. Upon agreement, the Auto Effort 242 will then be subject to the Data Auditing Process 334 pertaining to Primary CPEIs 356.

FIG. 13 also details those validation and verification procedures for Auto Efforts 242 as defined by the Auto Effort Rules 250. Validation and verification procedures include the following:

The System Auditor 348 can approve or reject the Auto Effort 242 via a DVIVD 5 Star Audit #2 Auto Effort Working Panel Screen Interface 249. This procedure utilizes CPEI Exhibits 124 and established Auto Effort Rules 250 as a means for approval. CPEI Exhibits 124 are stored in the Industry Data Repository Database 104 and may be submitted by the owner of the Auto Effort 242 or other Elements 300 involved in the Auto Effort 242.

If the Auto Effort Rules 250, and an Open Star Rules 252 254 256, have been met, the Auto Effort 242 will be stored in the Industry Core Database 106 as an Approved Auto Effort 259 with corresponding Open Star Icons 246. During this this process, Auto Effort 242 may be deemed Primary CPEI 356 or simply remain in the Industry Core Database 106 as Approved Auto Effort 259, If the Auto Effort Rules 250 have not been met, the Auto Effort 242 will be stored as an Unapproved Auto Effort 260 within the Industry Core Database 106 where it will remain inactive.

Figure 14:
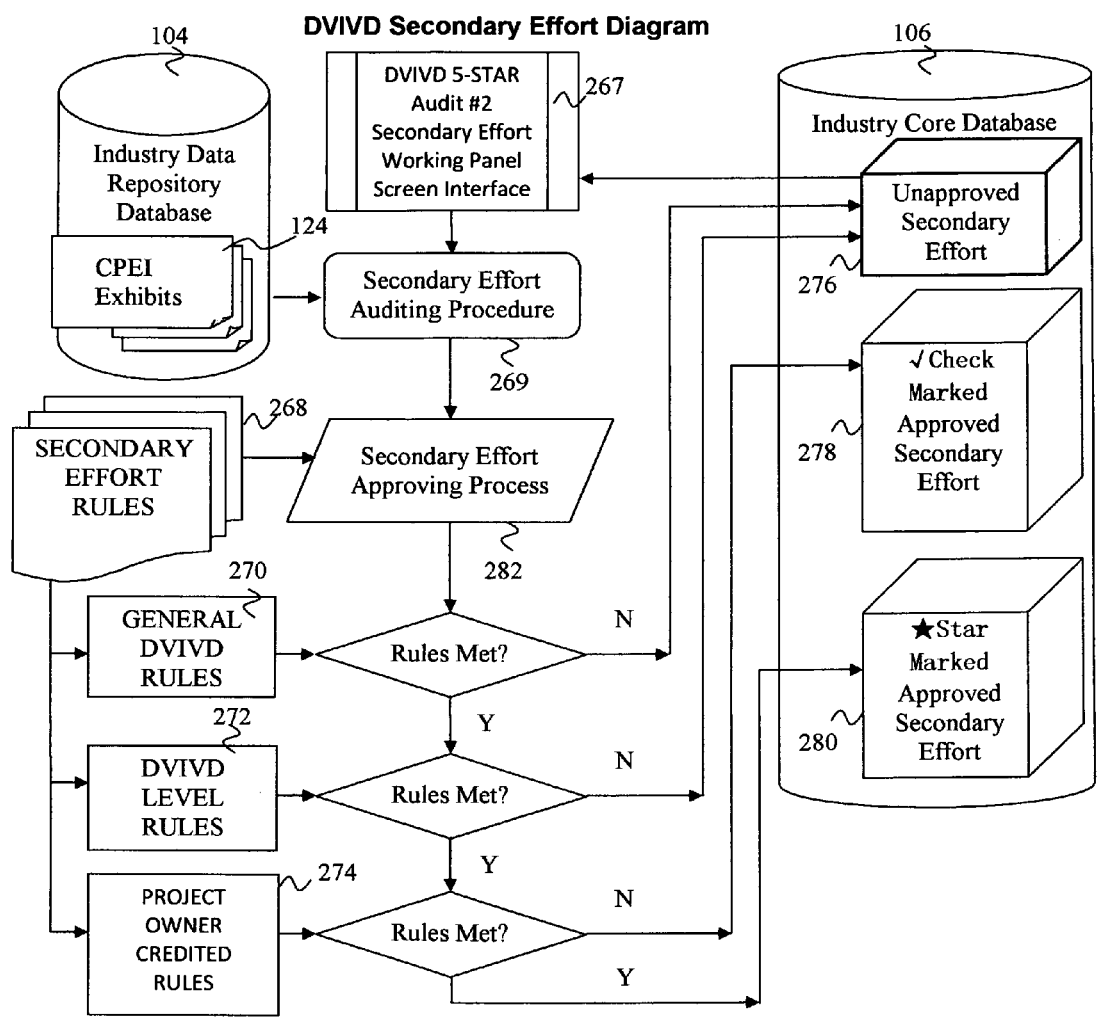
FIG. 14 describes the DVIVD Match Audit System and 5 Star Event Data Recorder Method Thereof with regard to the approval of Secondary Efforts.

FIG. 14 details how the DVIVD Match Audit System and 5 Star Event Data Recorder Method Thereof validates and verifies Secondary Efforts 226. Secondary Efforts 226 are awarded to Secondary Element 372 when the following a Secondary Effort Rules 268 have been met:

The Secondary Effort 226 on Project 306 can be established in the System when Element 300, also known as Secondary Element 372, has an approved association to the Primary Element 370 on the Project 306, wherein the Secondary Element 372 supported the Primary Element 370 in achieving their Primary CPEI 356.

When approved by the Project 306 owner, the Secondary Effort 226 will display a Secondary Star Icon 241; if not approved by the Project 306 owner, the Secondary Effort 226 will display Check Mark Icon 240.

Secondary Efforts 226 will not be displayed if the Primary Element 370 disapproves.

FIG. 14 also details validation and verification audit procedures for Secondary Efforts 226 as defined by the System and Method which include:

The System Auditor 348 can approve or reject Secondary Efforts 226 via a DVIVD 5 Star Audit 2 Secondary Effort Working Panel Screen Interface 267. This is part of a Secondary Effort Auditing Process 282 which utilizes CPEI Exhibits 124 and established Secondary Efforts Rules 268 as a means for approval. CPEI Exhibits 124 are stored in the Industry Data Repository Database 104 and may be submitted by the owner of the Secondary Effort 226 or other Elements 300 involved in the Secondary Effort 226.

Secondary Effort Rules 268 are comprised of, but not limited to, a General DVIVD Rules 270, a DVIVD Audit Level Rules 272, and a Project Owner Credited Rules 274.

If the Secondary Effort 226 meets the requirements and rules defined by the General DVIVD Rules 270, the Secondary Effort 226 will move on to the DVIVD Audit Level Rules 272 process. However, if said General DVIVD Rules 270 are not met, the Secondary Effort 226 will be stored in the Industry Core Database 106 as an Unapproved Secondary Effort 276 where it will remain inactive.

If the DVIVD Audit Level Rules 272 are met, the Secondary Effort 226 will move on to the Project Owner Credited Rules 274 process. However, if the DVIVD Audit Level Rules 272 are not met the Secondary Effort 226 will be stored in the Industry Core Database as Unapproved Secondary Effort 276 where it will remain inactive.

If the Project Owner Credited Rules 274 are met, the Secondary Effort 226 will be stored in the Industry Core Database 106 as a Star Marked Approved Secondary Effort 280, wherein the Secondary Effort 226 will be displayed with the Secondary Star Icon 241.

If the Project Owner Effort Rules 274 have not been met, the Secondary Effort 226 will be stored in the Industry Core Database 106 as a Check Marked Approved Secondary Credit 278, wherein the Secondary Effort 226 is displayed with Check Mark Icon 240 which indicates that, while approved, it has yet to pass the Project Owner Credited Rules 274.

Figure 15:
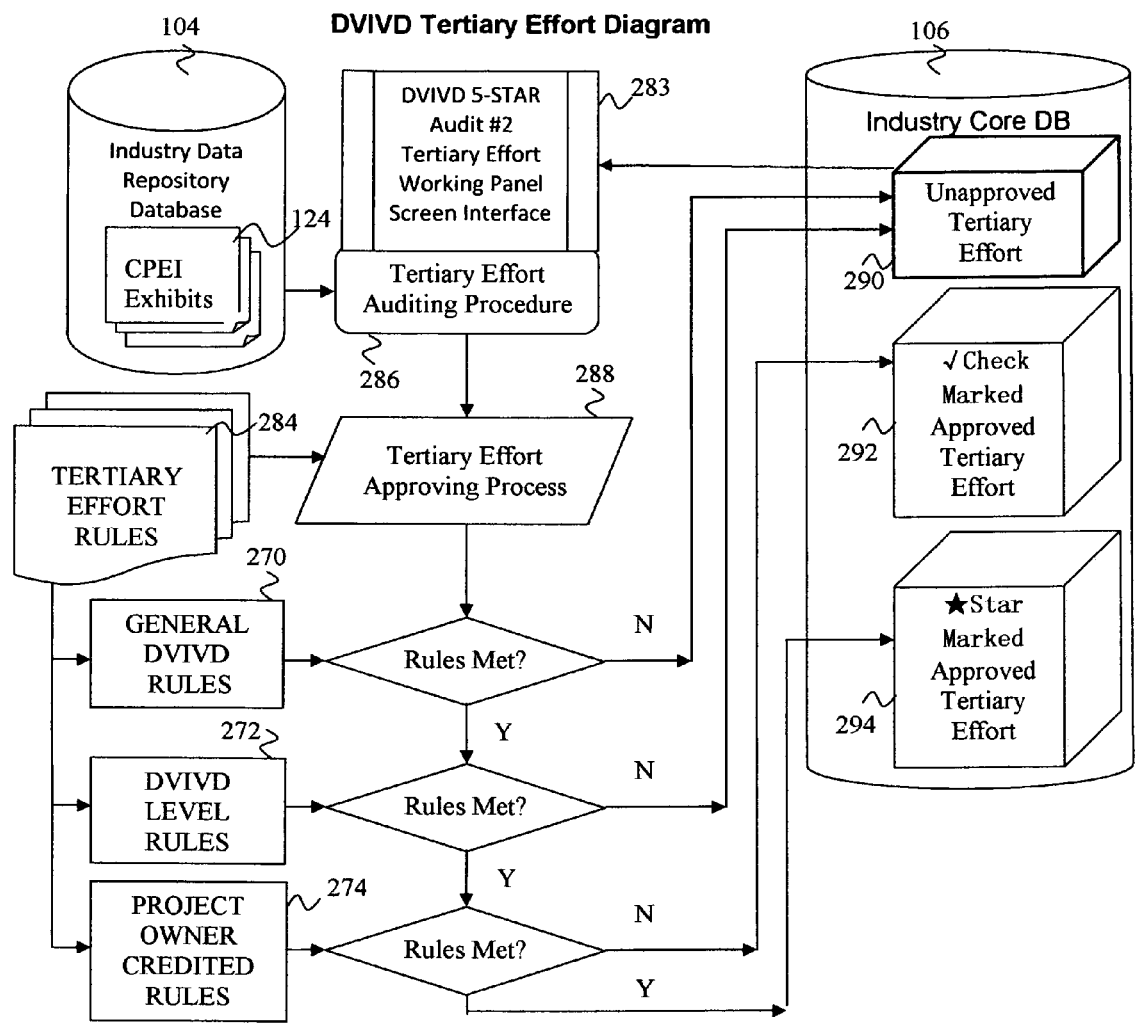
FIG. 15 describes the DVIVD Match Audit System and 5 Star Event Data Recorder Method Thereof with regard to the approval of Tertiary Efforts.

FIG. 15 illustrates how the DVIVD Match Audit System and 5 Star Event Data Recorder Method Thereof validates and verifies Tertiary Efforts 228. Tertiary Efforts 228 are awarded when a Tertiary Effort Rules 284 have been met and approved:

Tertiary Efforts 228 can be established when Element 300, also known as a Tertiary Element 374, has an approved association to the Secondary Element 372 with the Secondary Effort 226, wherein the approved association assisted the Secondary Element 372 in achieving the Secondary Effort 226.

Tertiary Efforts 228 must be approved by the Secondary Element 372 which is the subject of the Secondary Effort 226 to which the Tertiary Effort 228 is associated. When approved by the Secondary Element 372, the Tertiary Effort 228 will display the Check Mark Icon 240.

FIG. 15 also details the validation and verification procedures for Tertiary Efforts 228 as defined by the System and Method Thereof. Validation and Verification procedures include the following:

The System Auditor 348 can approve or reject Tertiary Efforts 228 via a DVIVD 5 Star Auditor Tertiary Working Panel Screen Interface 283. This is part of a Tertiary Effort Auditing Procedure 286 which utilizes CPEI Exhibits 124 and established Tertiary Efforts Rules 284 as a means for approval. CPEI Exhibits 124 are stored in the Industry Data Repository Database 104 and may be submitted by the owner of the Tertiary Effort 228 or other Elements 300 involved in the Tertiary Effort 228.

Tertiary Effort Rules 284 are comprised of, but not limited to, General DVIVD Rules 270, DVIVD Audit Level Rules 272, and Project Owner Credited Rules 274.

If the Tertiary Effort 228 meets the requirements and rules defined by the General DVIVD Rules 270, the Tertiary Effort 228 will move on to the DVIVD Audit Level Rules 272 process. However, if the General DVIVD Rules 270 are not met, the Tertiary Effort 228 will be stored in the Industry Core Database 106 as an Unapproved Tertiary Effort 290 where it will remain inactive.

If the DVIVD Audit Level Rules 272 are met, the Tertiary Effort 228 will move on to the Project Owner Credited Rules 274 process. However, if said DVIVD Audit Level Rules 272 are not met, the Tertiary Effort 228 will be stored in the Industry Core Database 106 as Unapproved Tertiary Effort 290 where it will remain inactive.

If the Project Owner Credited Rules 274 are met, the Tertiary Effort 228 will be stored as a Star Marked Approved Tertiary Effort 294 within the Industry Core Database 106, wherein the Tertiary Effort 228 will be reported with a Tertiary Star Icon 243 indicating its approval status.

If the Project Owner Credited Rules 274 have not been met, the Tertiary Effort 228 will be stored in the Industry Core Database 106 as a Check Marked Approved Tertiary Effort 292 which indicates that, while approved, it has yet to pass the Project Owner Credited Rules 274.

FIG. 16 describes the specific DVIVD Match Audit System and 5 Star Event Data Recorder Method Thereof in regards to Auto Inference Associations 244. Auto Inference Association Rules 376 include, but are not limited to, the following:

1. Auto Inference Associations 244 are automatically generated by the System when two Elements 300 in the System enter an Effort Instances 296 having Efforts 354 on a common Project 306 at a common Point in Phasetime 310. These associations are called an Inference 298.
2. Auto Inference Associations 244 are not stored in the tables in the Industry Core Database 106; they are generated dynamically by the System based on the Auto Inference Association Rules 376.
3. Auto Inference Associations 244 are considered unverified associations.
4. Only the individual Elements 300, the Project 306, and the Point in Phasetime 310 can be ascribed to those data fields in the Auto Inference Association 244.
5. The System will utilize an auto responder technology to contact the Elements 300 in the Auto Inference Association 244 to seek cooperation in verifying and validating the Inference 298 data.
6. If the Auto Inference Association 244 is confirmed by the Element 300 in the Auto Inference Association 244, the Element 300 can request that it be converted to Primary CPEI 356 through the various Data Auditing Processes 334 which use CPEI Exhibits 124 to verify and validate the data.
7. When Auto Inference Associations 244 are verified through the Data Auditing Processes 334, the approved associations will be entered into the Industry Core Database 106.

What is claimed is:

1. A live Dual Validated Independently Verified Dynamic (DVIVD) Match Audit System comprising a first device for transmitting an element effort event data, which data details an effort of an element on an event, and a source data exhibit;

a second device for receiving said element effort event data and said source data exhibit a computerized device for storing said element effort event data in an industry data repository database and said source data exhibit in an exhibit database, for validating and independently verifying said element effort event data utilizing a real time match audit method for collecting, examining, and tracking said element effort event data, migrating said element effort event data from said industry data repository database into a staging area upon approval of a first semi-automated audit process, assigning a dataset fulfillment audit level to said element effort event data, and reporting said element effort event data in an audited report.

2. The system as recited in claim 1 whereas said element effort event data are validated and independently verified utilizing said real time match audit method comprising the steps of (i) receiving and examining said element effort event data, (ii) inputting said element effort event data in said industry data repository database and said source data exhibit in said exhibit database in said computerized device, (iii) validating and independently verifying said element effort event data has been accurately inputted into said industry data repository database, and furthermore verifying said element effort event data in said industry data repository database matches said element effort event source data exhibit in said exhibit database by said first semi-automated audit process, thereafter said effort event data are migrated from said industry data repository database into said staging area upon approval of said first semi-automated audit process, (iv) assigning said dataset fulfillment audit level to said element effort event data by a system auditor, and (v) a further step of migrating said element effort event data from said staging area into an industry core database in said computerized device at said dataset fulfillment audit level upon said system auditor approval.

3. The system as recited in claim 1 whereas said element effort event data are further validated and independently verified by a fully automated second audit process comprising auditing said element effort event data and said element effort event data audit level reported from said industry core database against said element effort event data and said element effort event data audit level in said repository database, reporting an audit match or an audit mismatch resulting from said second audit process of said element effort event data reported from said industry core database against said element effort event data in said industry data repository database, reporting a database location of any said audit mismatch resulting from said second audit process, making any required corrections in said industry core database or said industry data repository database when said audit mismatch occurs, reporting an audited Conjoined Project Effort Instance (CPEI) display of said element effort event data by a CPEI data generating module upon query, whether said element effort event data was inputted by an effort owner directly or whether said element effort event data was dynamically generated by the system's method automatically from said element effort event data inputted by other said elements, displaying a Validated and Verified (VIV) icon according to system rules and auditing processes when reporting said CPEI which delineates said effort acknowledged by an event project owner as a credited effort from said effort not acknowledged by said event project owner as said credited effort, and transmitting said audited CPEI to a client machine for display with accompanying said VIV icon indicating said CPEI audit level and whether said CPEI displayed is said effort or is said credited effort.

4. A live Dual Validated Independently Verified Dynamic (DVIVD) Match Audit method, comprising the steps of (i) tracking and displaying a) an element effort event data, b) an element effort event Conjoined Project Effort Instance (CPEI) dataset fulfillment, c) an element effort event data CPEI audit level, d) an element effort event data dual audit match testing analysis, and e) an element effort event data auditing processes, (ii) recording and displaying said element effort event CPEI dataset fulfillment in a DVIVD Event Data Match Audit Recorder in real time, (iii) recording and displaying in said DVIVD Event Data Match Audit Recorder a "Match" light indicator or a "Mismatch" light indicator resulting from a system dual audit match testing analysis in real time, (iv) recording and displaying a VIV icon indicating whether a reported effort is further classified as a credited effort when so acknowledged by an event project owner in said DVIVD Event Data Match Audit Recorder in real time, and (v) recording and displaying said element effort event data CPEI audit level assigned to said element effort event data according to system rules and auditing processes, including the system highest audit a System Audit Certified Effort in said DVIVD Event Data Match Audit Recorder in real time.

* * * * *